UNITED STATES PATENT OFFICE.

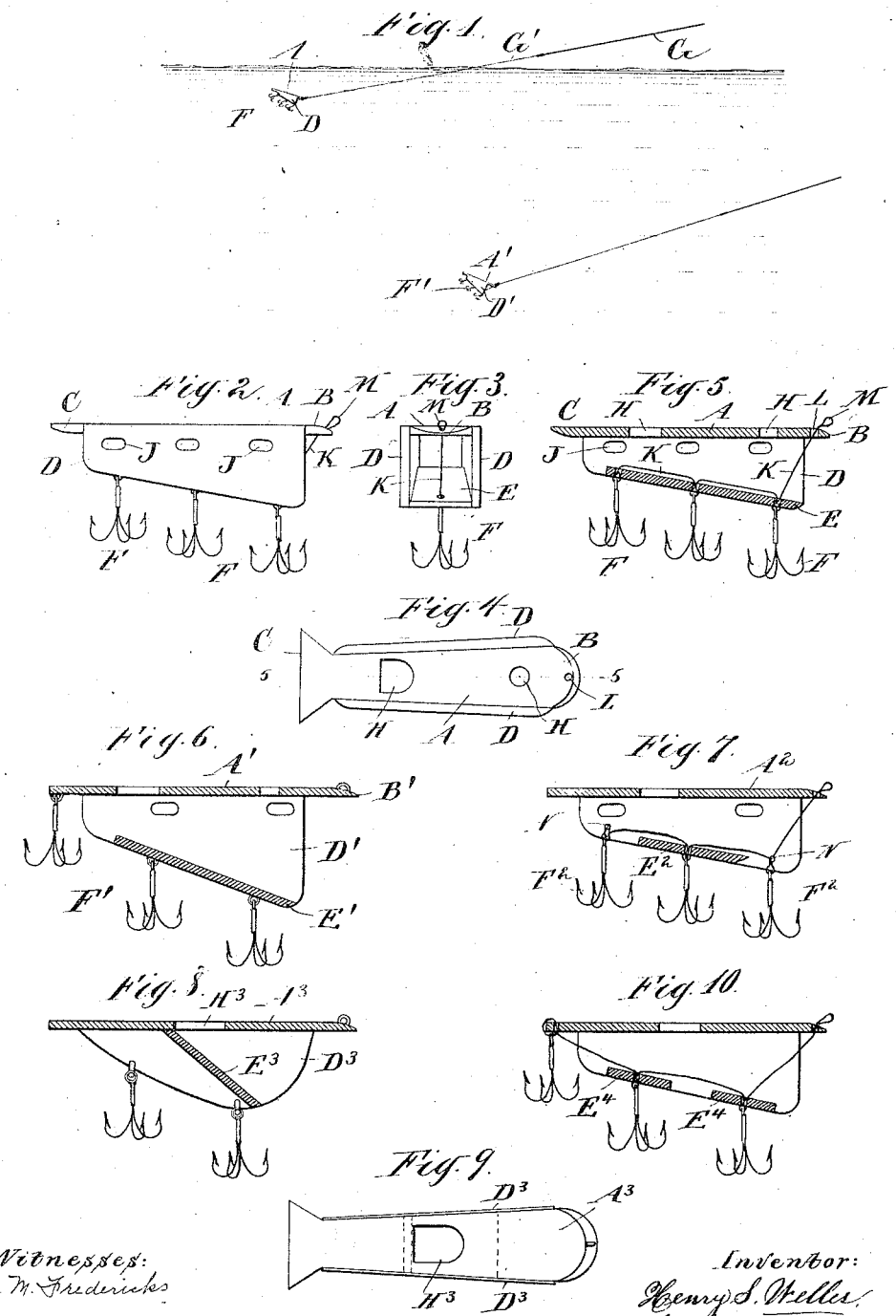

HENRY S. WELLES, OF NEW YORK, N. Y.

ARTIFICIAL BAIT.

1,078,886.  Specification of Letters Patent.  Patented Nov. 18, 1913.

Application filed July 30, 1912. Serial No. 712,276.

*To all whom it may concern:*

Be it known that I, HENRY S. WELLES, a citizen of the United States, residing in the city of New York, borough of Manhattan, in the county and State of New York, have invented a certain new and useful Improvement in Artificial Baits, of which the following is a specification.

The invention relates to floating artificial baits, and the object of the invention is to provide a bait of this character which shall dive beneath the surface when drawn through the water in trolling, or on the recovery of the line in casting, and travel in a path below the surface while such motion is maintained and float upon the surface when at rest.

The invention consists in certain novel features of construction and arrangement by which the above object is attained to be hereinafter described.

The accompanying drawings form a part of this specification and show approved forms of the invention.

Figure 1 is a side view of two of the baits in action, one adapted to travel near the surface, and the other at a greater depth. The remaining figures are on a larger scale. Fig. 2 is a side elevation of a preferred form of the improved bait constructed for shallow travel. Fig. 3 is a front elevation of the same, and Fig. 4 a top or plan view. Fig. 5 is a corresponding longitudinal vertical section, on the line 5—5 in Fig. 4, and partly in elevation. Fig. 6 is a similar section of a bait adapted for deep travel. Figs. 7 and 8 are longitudinal vertical sections showing modified forms, and Fig. 9 is a plan view of the form shown in Fig. 8. Fig. 10 is a similar section and part elevation of another modification.

Similar letters of reference indicate like parts in all the figures.

In all the forms the bait comprises a hollow box-like structure open at the front and having a flat top portion tapered from front to rear, vertical sides depending from the top and similarly tapered, and an inclined plane between the sides and forming the bottom of the structure.

Referring to Figs. 2 to 5 inclusive, and to the uppermost bait shown in Fig. 1, A is the top which may be understood to be of thin light wood, tapered from the nose B to the tail C at the rear, and D D are the sides of less length than the top to provide an overhang or projection of the nose B and tail C, as shown, tapered from front to rear and joined to the edges of the top and also by a tapered plane E extending from the front nearly to the rear on an angular inclination to the under face of the top. Hooks F F, singly or in gangs, as shown, are attached to the under face of the plane E and serve either with or without additional ballast in maintaining the desired position with the top A uppermost and sides D D vertical when the bait is in the water. When lying idly on the water the bait floats in this position on the surface, but when drawn by the line G the action of the water on the plane E causes it to dive beneath the surface and travel in the submerged condition, the depth depending upon the relative inclination of the plane to the top, the quantity and location of ballast, and the speed at which the device is drawn through the water.

To permit the escape of air partially imprisoned in the interior and allow immediate descent in casting, the opening H H are provided in the top A and additional openings J J in the sides near the top, through which the air may pass quickly; and to prevent the escape of the fish, even though the bait be crushed between its jaws, the hooks F F are attached to and connected by a wire K extending through an opening J in the nose B and provided with a loop M to which the line G or leader $G^1$ may be secured.

In Fig. 6 the general construction is as above described, but the angle of inclination of the plane $E^1$ to the top $A^1$ is greater; this form will under like conditions tend to travel at a greater depth, as indicated by the lowermost bait in Fig. 1. In this form the nose $B^1$ projects farther forward to present a greater area in advance of the sides $D^1 D^1$ and plane $E^1$ to aid in insuring a quick dive. The hooks $F^1$ are shown as secured and arranged differently to the preceding figures but it will be understood they may be similarly arranged.

Fig. 7 shows a form in which the plane $E^2$ is reduced in length relatively to the top $A^2$, and two of the hooks $F^2$ are supported by cross-rods or wires N extending from side to side.

In Figs. 8 and 9 a form is shown in which the sides $D^3 D^3$ are of thin metal and the plane E³ extends to the under face of the top A³, a single vent H³ is provided in the top of sufficient area to permit the escape of air and the current of water induced by the movement of the bait.

Fig. 10 shows a modification resembling the form in Fig. 7 but having the plane E⁴ divided into two portions.

The general action of all the forms is the same, but each will differ somewhat in individual action as to depth of travel and steadiness of motion under varied speeds.

Other modifications may be made in the forms and proportions, and ballast may be added and located as found necessary or desirable.

I claim:—

1. The floating bait described consisting of a top portion of less gravity than water and having a continuous flat upper surface, a plane beneath said top, carried by the latter and arranged at an inclination thereto, and means for ballasting such bait.

2. The floating bait described consisting of a top portion of less gravity than water and having a continuous flat upper surface, sides depending from said top, an inclined plane supported by and between said sides, and means for ballasting said bait.

3. The floating bait described consisting of a top portion of less gravity than water and having a continuous flat upper surface, sides depending from said top, and a plane between said sides, and arranged at an inclination to said flat top, the whole forming a box-like structure open at the front.

4. The floating bait described consisting of a top portion of less gravity than water and having a continuous flat upper surface, sides depending from said top, and an inclined plane between said sides, the whole forming a box-like structure substantially rectangular in cross-section open at the front, said top having an opening therein.

5. The floating bait described consisting of a top portion of less gravity than water, sides depending from said top, and an inclined plane between said sides, the whole forming a box-like structure substantially rectangular in cross-section open at the front, said top and sides having openings therein.

6. The artificial bait described consisting of a top portion of less gravity than water, and an inclined plane carried by said top portion beneath the latter independent of and separated therefrom and arranged to submerge such bait when drawn through the water.

7. The artificial bait described comprising a box-like structure open at the front and having a top portion of less gravity than water and having a continuous flat upper surface, a plane inclined rearwardly and upwardly from the front toward said top portion, and sides depending from said top-portion and supporting said plane.

8. The artificial bait described comprising a box-like structure open at the front and having a top portion of less gravity than water, a plane inclined rearwardly and upwardly from the front toward the said top portion, hooks on the under part of said structure, and connecting means carried by the latter to which said hooks are attached and having means for attaching a line thereto.

9. The artificial bait described comprising a box-like structure open at the front and having a top portion of less gravity than water and having a continuous flat upper surface, sides depending from said top portion, a plane mounted between said sides and inclined upwardly and rearwardly from the front toward said top portion, a nose on said top portion extending beyond said sides and plane, and hooks on the lower part of such structure.

10. The artificial bait described comprising a box-like structure open at the front and having a top portion of less gravity than water and having a continuous flat upper surface, sides depending from said top portion, a plane mounted between said sides and inclined upwardly and rearwardly from the front toward said top portion, a nose on said top portion extending beyond said sides and plane, and hooks on the lower part of such structure, said top and sides having openings therein.

11. An artificial bait comprising a flat-faced top portion of less gravity than water, and a member supported beneath said top portion at an inclination thereto and at a distance therefrom, said member being provided with hooks.

In testimony that I claim the invention above set forth I affix my signature, in presence of two witnesses.

HENRY S. WELLES.

Witnesses:
CHARLES R. SEARLE,
CORA M. FREDERICKS.